April 3, 1956     F. N. BARD     2,740,646
CUSHIONED UNIVERSAL PIPE JOINT
Original Filed June 12, 1947
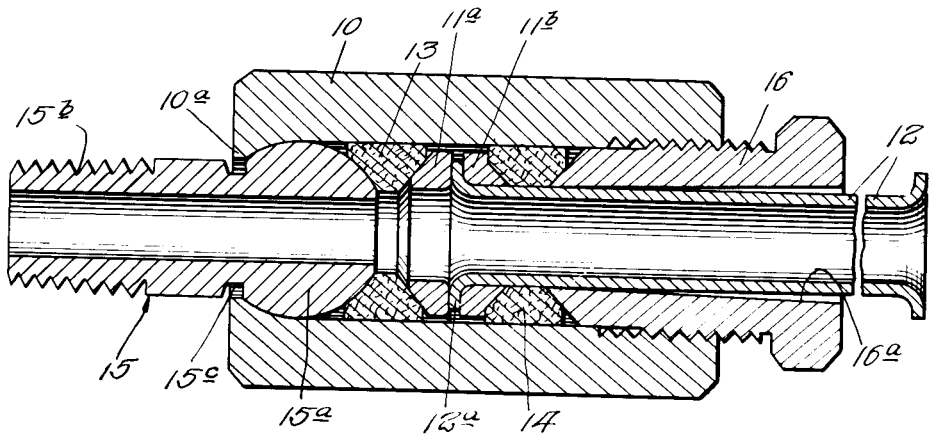
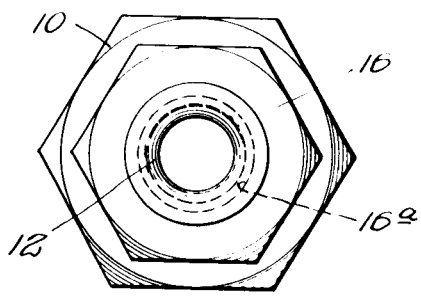
Inventor:
Francis N. Bard,
By Schrader, Merriam,
Hofgren, Brady, Attys.

United States Patent Office 2,740,646
Patented Apr. 3, 1956

2,740,646

CUSHIONED UNIVERSAL PIPE JOINT

Francis N. Bard, Barrington, Ill.

Original application June 12, 1947, Serial No. 754,181. Divided and this application June 14, 1951, Serial No. 231,581

2 Claims. (Cl. 285—11)

This invention relates to a joint, and more particularly to a joint providing for at least limited universal ball movement and also having resilient means for accommodating vibratory movement.

This application is a division of my application Serial No. 754,181, filed June 12, 1947 and issued June 26, 1951 as Patent No. 2,557,930.

One feature of this invention is that it provides an improved joint which is very simple and convenient to install and quite satisfactory in use, particularly where the major problem is accommodation of slight movement, as that due to vibration; another feature of this invention is that it provides a joint having resilient packing arranged so that movement for vibration absorption is provided without the necessity of movement of a ball part, so that it is particularly useful in situations where vibration would otherwise quickly fatigue tubing, particularly at its point of connection; yet a further feature of this invention is that the joint may be very readily and conveniently assembled on the job, both to the section of tubing or the like with which it may be used and to another part of the conduit; and another feature of this invention is that a good seal is maintained between the section of tubing and the casing without the need of any especially high degree of precision in the manufacture of the joint.

Other features and advantages of this invention will be apparent from the following specification and the drawings, in which:

Figure 1 is a vertical sectional view of one embodiment of my invention, and of a tubing section to which it is connected, this view being along the axis of the joint and tubing;

Figure 2 is an end view looking from the right of Figure 1.

There are, of course, innumerable situations where a joint is desirable in connecting one section of a conduit to another, or to some device to which it is to be connected. Situations where one of the conduit sections comprises tubing and where there is some almost constant relative movement between the connected parts, as movement which is the result of vibration, have presented particular problems. I am here disclosing and claiming a joint which has the usual advantage of a ball joint in permitting angular movement between the parts which it connects (either at the time of initial installation and alignment or upon some major movement) and which also includes a resilient annular packing providing movement for vibration absorption without requiring movement of any joint part relative to the surface of the packing until a certain angularity has been exceeded.

In the particular embodiment of my invention illustrated herewith, the joint includes an outer joint member 10 having its inner bore generally cylindrical and its exterior hexagonal in the particular form shown, as may be best seen in Figure 2. An inner joint member is here shown as formed of two separate, but cooperating annular rings 11a and 11b. These rings are adapted to engage and hold between them the end of a piece of tubing 12, the inner end of this tubing being flared outwardly (as by any conventional flaring tool) to provide an annular flange 12a received and held between the two annular inner joint members 11a and 11b. Abutting against the outer surface of the annular member 11a (tapered as shown), is located an annular resilient gasket ring 13; and abutting against the opposite annular tapered surface of the ring member 11b is a similar annular gasket 14. Each of the gasket rings 13 and 14 are wedge-shaped in cross-section as here shown, with the small ends of the wedges being to the inside thereof; and they are both of relatively soft quite resilient material, as synthetic rubber. The gasket ring 14 is adapted to extend between the inner surface of the outer joint memebr 10 and the outer surface of the tubing 12.

Within the outer joint member 10 which is opposite the end receiving and holding the tubing 12, there is located a connecting nipple 15 including a spherical or ball portion 15a. This ball member bears against an annular flange 10a formed at the end of the outer joint member 10. The ball member has extending therefrom a stem 15b which may be threaded for connection to a conduit in any suitable manner and the portion of the stem adjacent the ball portion has an annular recess here identified as 15c opposite the outer flange member 10a. This permits a substantial degree of angular movement of the ball member with respect to the outer casing member 10, capable of accommodating substantial angular differences in initial installation of the joint, or occasional substantial angular movement of a conduit section.

The ball member 15a extends between the flange 10a and the first gasket ring 13. Thus, the gasket 13 serves to seal the space between the ball member and the outer casing member while the gasket 14 serves to seal the space between the tubing 12 and the outer casing member. In order that the various parts of the joint will be held in sealing relationship, the inner surface of the tubing end of the outer casing member is threaded, these threads being arranged to be engaged by and to hold threads on the outer surface of an annular plug member 16. This plug member is ordinarily substantially concentric with respect to the tubing 12 as well as the outer casing member 10. The inner end of the plug member, tapered as illustrated, is adapted to bear against the tapered side of the second gasket ring 14 and thus hold all of the inner elements of the joint tightly in sealing relationship. The inner surface 16a of the plug member 16 is provided with a gradually increasing diameter from the inner end of the plug member to the outer end thereof. This permits a substantial degree of vibration or angular movement of the tubing 12, with the resilient packing rings also being capable of accommodating slight axial movement thereof.

The construction illustrated provides a joint which has proved particularly satisfactory commercially. The ball or nipple part 15, the packing ring 13, and the inner joint member section 11a can all be dropped in (in that order) through the right hand end of the outer casing member (speaking of the parts relative to the positions illustrated in the accompanying drawing). The threaded end of the nipple 15 may then, if desired, be screwed into a threaded pipe or hole of any type, or otherwise connected to a conduit section, as by a shoulder nut and flared tubing. The plug member 16, gasket ring 14, and inner joint member section 11b would then be slipped over the end of the tubing 12 in that order, and the end of the tubing cut to length and flared with any conventional flaring tool to provide the flange 12a illustrated. Assembly may then be completed by moving the last mentioned parts along the tubing and screwing the plug member into the end of the outer section of the joint until a firm, properly sealed, relationship between the parts has been obtained.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A pipe joint of the character described, including: a tubular outer joint member provided with a spherical inner surface portion; a first inner joint element adapted to be connected to a conduit and including a spherical portion in contact with said surface portion and having at least limited universal movement with respect to said outer member, said element having a flow passage therethrough; a second inner joint element, comprising two rigid, substantially frusto-conical annular members within the outer joint member and adapted to receive the flared end of a piece of tubing therebetween; a first resilient annular member within said outer joint member and between said first and second inner joint elements; a second resilient annular member within said outer joint member and on the other side of said second inner joint element; and threaded means mounted on said outer joint member for applying pressure to said second resilient annular member to hold all of the parts in tight engagement and to cause the resilient members to center the frusto-conical members in said outer joint member.

2. A pipe joint of the character described, including: a tubular outer joint member of cylindrical shape having an inturned flange at one end thereof and provided with a spherical inner surface portion adjacent the flange; a first inner joint member including a spherical portion arranged adjacent said flange and in contact with the spherical inner surface portion of said outer joint member to provide at least limited universal movement between the outer joint member and the first inner joint member, said inner joint member having a flow passage therethrough; a second inner joint element comprising two rigid annular frusto-conical members within the outer joint member and adapted to receive the flared end of a piece of tubing therebetween; a first relatively soft and resilient annular packing member within the outer joint member and interposed between the first inner joint member and one of said frusto-conical members, contacting the spherical portion of the first inner joint member, the inner surface of the outer joint member and said one of the frusto-conical members, providing a three-way seal therebetween; a second relatively soft and resilient annular packing member within the outer joint member and contacting the frusto-conical surface of the other of said two rigid members, the tubing and the inner surface of the outer joint member providing a three-way seal therebetween; and annular adjustable means held within the end of the outer member opposite to the flange and serving to apply pressure to said second packing member to hold all the parts in tight engagement and to cause said resilient members to center the frusto-conical members in said outer joint member, said annular adjustable means being located around said tubing with its inner end having an inner diameter slightly larger than the outer diameter of the tubing and gradually increasing in inner diameter to its outer end.

References Cited in the file of this patent

UNITED STATES PATENTS

| | | |
|---|---|---|
| 1,565,013 | Jordon | Dec. 8, 1925 |
| 1,603,916 | Hundemer | Oct. 19, 1926 |
| 1,669,949 | Reynolds | May 15, 1928 |
| 2,035,978 | Parker | Mar. 31, 1936 |
| 2,448,888 | Hynes | Sept. 7, 1948 |
| 2,460,032 | Risley | Jan. 25, 1949 |
| 2,550,536 | Delano | Apr. 24, 1951 |
| 2,590,776 | Kuhn | Mar. 25, 1952 |

FOREIGN PATENTS

| | | |
|---|---|---|
| 681,220 | France | Jan. 28, 1930 |